(12) United States Patent
Shook et al.

(10) Patent No.: US 10,221,023 B2
(45) Date of Patent: Mar. 5, 2019

(54) TRAIN LOADING SYSTEM

(71) Applicant: Technological Resources Pty. Limited, Brisbane (AU)

(72) Inventors: Andrew Arthur Shook, Mt. Pleasant (AU); Andreas Alexander Kupfer, Two Rocks (AU); Brett Hamilton, Roleystone (AU); Chong Yew Ong, Ultimo (AU)

(73) Assignee: Technological Resources Pty. Limited, Melbourne (AU)

( * ) Notice: Subject to any disclaimer, the term of this patent is extended or adjusted under 35 U.S.C. 154(b) by 344 days.

(21) Appl. No.: 14/897,475

(22) PCT Filed: Jun. 11, 2014

(86) PCT No.: PCT/AU2014/000604
§ 371 (c)(1),
(2) Date: Dec. 10, 2015

(87) PCT Pub. No.: WO2014/197930
PCT Pub. Date: Dec. 18, 2014

(65) Prior Publication Data
US 2016/0130096 A1    May 12, 2016

(30) Foreign Application Priority Data

Jun. 11, 2013 (AU) ................. 2013902113

(51) Int. Cl.
*B65G 67/22* (2006.01)
*G01G 13/04* (2006.01)
(Continued)

(52) U.S. Cl.
CPC .......... *B65G 67/22* (2013.01); *B65G 67/06* (2013.01); *G01G 11/003* (2013.01); *G01G 13/04* (2013.01);
(Continued)

(58) Field of Classification Search
CPC .. G01G 11/003; G01G 13/04; G01G 13/2957; G01G 19/04; G01G 23/18
(Continued)

(56) References Cited

U.S. PATENT DOCUMENTS 3,430,751 A * 3/1969 Bateson ................. G01G 11/06
  122/55
4,284,380 A * 8/1981 Brumbaugh, Jr. ...... B65G 67/22
  141/83
(Continued)

FOREIGN PATENT DOCUMENTS

SU           659489 A1    4/1979

OTHER PUBLICATIONS

Aug. 25, 2014—(WO) International Search Report—PCT/AU2014/000604.

*Primary Examiner* — Lynn E Schwenning

(74) *Attorney, Agent, or Firm* — Banner & Witcoff, Ltd.

(57) ABSTRACT

A train loading system for loading material onto cars of a train is disclosed. The system comprises a material bin arranged to receive material to be loaded onto the train, a closure device arranged to facilitate control by an operator of the amount of material loaded into each car from the material bin, and a car mass estimator arranged to estimate the mass of material loaded into each car. The system also comprises a display arranged to communicate to the operator the estimated mass of material loaded into each car. A corresponding method is also disclosed.

21 Claims, 10 Drawing Sheets

(51) Int. Cl.
  *G01G 13/295* (2006.01)
  *B65G 67/06* (2006.01)
  *G01G 11/00* (2006.01)
  *G01G 19/04* (2006.01)
  *G01G 23/18* (2006.01)

(52) U.S. Cl.
  CPC ......... *G01G 13/2957* (2013.01); *G01G 19/04* (2013.01); *G01G 23/18* (2013.01)

(58) Field of Classification Search
  USPC .......................................................... 414/21
  See application file for complete search history.

(56) References Cited

U.S. PATENT DOCUMENTS

| | | |
|---|---|---|
| 4,629,392 A | 12/1986 | Campbell et al. |
| 5,909,999 A | 6/1999 | Manstrom |
| 6,155,767 A | 12/2000 | Walker |
| 2014/0321950 A1* | 10/2014 | Krenek ................. E21B 43/267 414/21 |

* cited by examiner

TRAIN LOADING SYSTEM

CROSS-REFERENCE TO RELATED APPLICATIONS

The present application is a U.S. National Phase filing of International Application No. PCT/AU2014/000604, filed on Jun. 11, 2014, designating the United States of America and claiming priority to Australian Patent Application No. 2013902113 filed Jun. 11, 2013, and the present application claims priority to and the benefit of both the above-identified applications, which are incorporated by reference herein in their entireties.

FIELD OF THE INVENTION

The present invention relates to a train loading system for loading mined material onto a train at a mine operation.

BACKGROUND OF THE INVENTION

It is known to provide a mine operation such as a mine site with a train loading facility arranged to facilitate loading of material onto dedicated material transport trains by train loadout operators.

Typically, the cars of such trains have an associated overload mass limit that for safety reasons should not be exceeded, and train loadout operators are typically responsible for ensuring that the mass of each train car is below the overload limit.

However, the task of ensuring that each car mass is below the overload mass limit is not simple because the material tends to be loaded into the cars at high speed, and the density of the material loaded into the cars is variable. In addition, each car is typically weighed when the car has moved away from the material flow, for example 4 car lengths away. As a consequence, the mass of material in a car can vary significantly and a car overload situation may not be detected until several more cars have been filled.

When a car mass overload is detected, it is necessary to stop the train loading process in order that the excess material in the car can be removed, but this causes undue delays.

In order to reduce the likelihood of stoppages during the train loading process, operators tend to load the train cars conservatively, and while the likelihood of train stoppages is much reduced as a result, a consequence is that at least some of the train cars are loaded significantly under the mass overload limit, and this equates to a significant loss of production.

SUMMARY OF THE INVENTION

It will be understood that in the present specification a mine operation means any operation or facility associated with extracting, handling, processing and/or transporting bulk commodities in a resource extraction environment or part of such a process, for example mine sites, rail facilities, port facilities, and associated infrastructure.

In accordance with a first aspect of the present invention, there is provided a train loading system for loading material onto cars of a train, the system comprising:
 a material bin arranged to receive material to be loaded onto the train;
 a closure device arranged to facilitate control by an operator of the amount of material loaded into each car from the material bin;
 a car mass estimator arranged to estimate the mass of material loaded into each car; and
 a display arranged to communicate to the operator the estimated mass of material loaded into each car.

In an embodiment, the closure device is arranged so as to facilitate closing of the closure device in response to operator control.

In an embodiment, the closure device is arranged so as to facilitate opening of the closure device in response to operator control.

In an embodiment, the car mass estimator is arranged to estimate the mass of material loaded into the material bin, to estimate a change in mass of the material bin and to use the estimate of the mass of material loaded into the material bin and the estimate of the change in mass of the material bin to calculate an estimated car mass value indicative of an estimate of the material loaded into a car.

In an embodiment, the train loading system includes a conveyor arranged to transport material to the material bin, and the car mass estimator includes a weightometer associated with the conveyor and arranged to measure the mass of material on the conveyor as the material passes over the weightometer.

In an embodiment, an end of the conveyor is disposed adjacent the bin and the weightometer is disposed a defined distance from the end of the conveyor, wherein the car mass estimator is arranged to apply a delay to each weightometer measurement and to use the delayed weightometer measurement and the speed of the conveyor to estimate of the mass of material loaded into the material bin.

In an embodiment, the system includes at least one bin level sensor arranged to produce bin mass data indicative of a change in bin mass, and the system is arranged to process the bin mass data so as to reduce noise.

In an embodiment, the system includes a car weigher arranged to measure the mass of a loaded car, and the system is arranged to display measured car mass values on the display.

In an embodiment, the system is arranged to calculate a variability value indicative of the variability of the measured car mass values and/or the estimated car mass values. The variability value may be a standard deviation value.

In an embodiment, the system is arranged to use a desired probability value indicative of the probability of occurrence of a car overload and the variability value to calculate an aim set point mass indicative of a target car mass.

In an embodiment, the system is arranged to display the aim set point mass on the display.

In an embodiment, the system is arranged to calculate a reliability value indicative of the degree of correlation between estimated car mass values and corresponding measured car mass values, and to display information indicative of the reliability value on the display.

In an embodiment, the system is arranged to automatically open and close the closure device in synchronization with movement of a train.

In an embodiment, the system comprises an overload controller arranged to monitor the estimated car mass as the car is loaded with material and to automatically close the closure device when an estimated car mass value reaches a defined overload car mass.

In accordance with a second aspect of the present invention, there is provided a method of loading a train at a mine operation, the method including:
 adding material to be loaded onto the train to a material bin;

providing a closure device arranged to facilitate control by an operator of the amount of material loaded into each car from the material bin;

estimating the mass of material loaded into each car and producing an estimated car mass value for each car;

communicating the estimated car mass values to the operator on a display;

determining whether to modify the mass of material loaded into a car based on the displayed estimated car mass values; and controlling the closure device to modify the mass of material loaded into a car if the determination indicates that modification of the mass of material loaded into the car is necessary.

BRIEF DESCRIPTION OF THE DRAWINGS

The present invention will now be described, by way of example only, with reference to the accompanying drawings, in which.

DESCRIPTION OF AN EMBODIMENT OF THE INVENTION

An embodiment of a train loading system will now be described with reference to mine operations in the form of mine sites, although it will be understood that other mine operations wherein train loading operations occur are envisaged.

Figure 1:
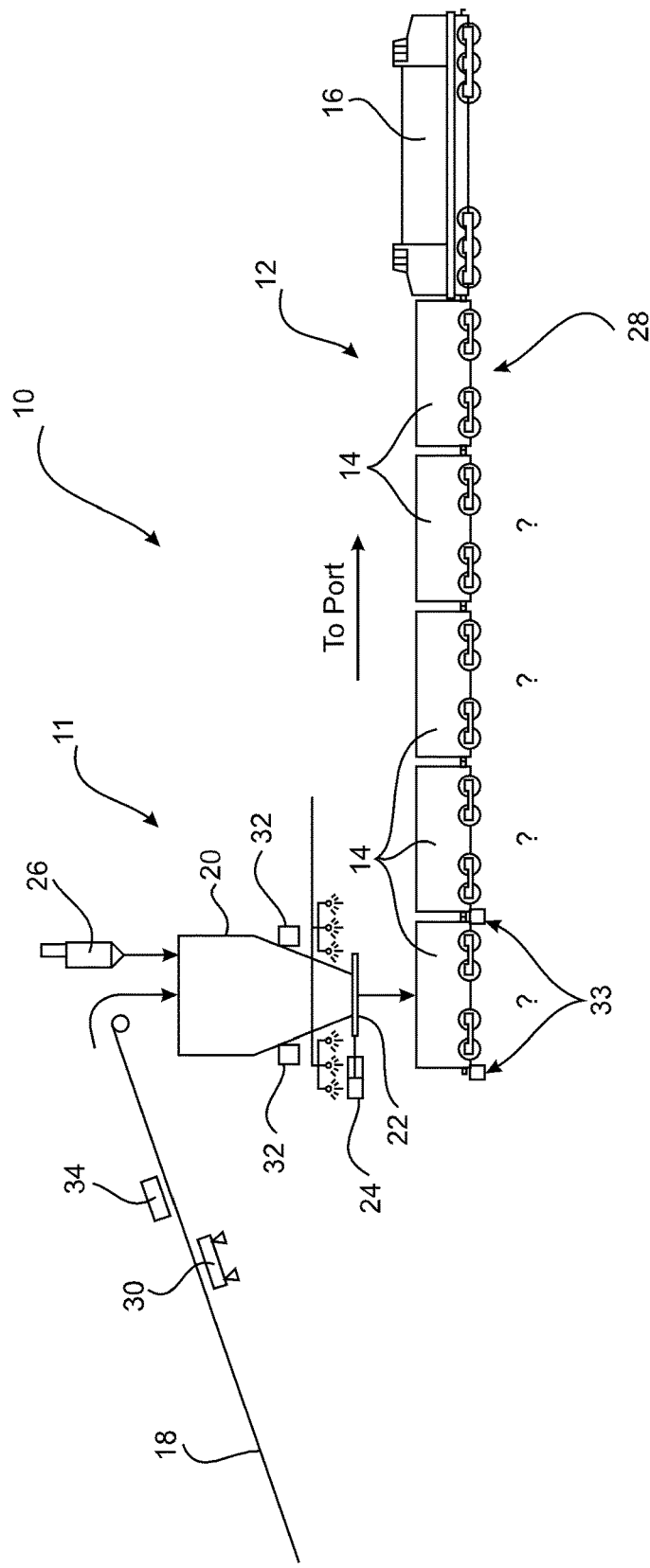
FIG. 1 is a diagrammatic representation of a train loading facility including a train loading system according to an embodiment of the present invention.

An example conceptual diagram illustrating a train loading facility 10 is shown in FIG. 1.

The train loading facility 10 includes a train loading system 11 arranged to load a train 12 with material, in this example ore derived from one or more mine sites.

Each train 12 includes a plurality of cars 14 and at least one, and typically three (3), locomotives 16. Material to be disposed in the cars 14 is transported to the train loading facility 10 using a conveyor 18 that delivers the material to a material bin 20. In this example, the material bin 20 is of a type arranged to hold about 2000 tonnes, although it will be understood that other types of material bin are possible.

The bin 20 is associated with a closure device, in this example in the form of a clam 22, that is controllable using a closure control device 24. In this example, the closure control device 24 is arranged to automatically open the clam 22 when a car 14 arrives under the clam 22, and to automatically close the clam 22 before the car moves away from the clam 22. The closure control device 24 in this example uses signals from train location sensors 33 to synchronise opening and closing of the clam 22 with movement of the train 12. The closure control device 24 is also arranged such that the amount of material delivered to a car 14 is manually adjustable by an operator by enabling the operator to open or close the clam 22 early, or override automatic opening of the clam 22 in response to the position of the car and allow the operator to open or close the clam late, that is, after the clam 22 is intended to automatically open or close in response to the position of the car determined by the train location sensors 33.

The train loading system 11 also includes a dust filter 26, a moisture analyser 34 and a car weigher 28 arranged to weigh each train car 14 as the train car 14 passes. The car weigher 28 is disposed a sufficient distance away from the bin 20 so as to avoid undue interference caused by material loading, in this example a distance equivalent to 4 cars away from the bin 20.

The train loading system 11 also includes a weightometer 30 arranged to weigh material on the conveyor 18 as the material is transported on the conveyor 18 to the bin 20. In this example, the weightometer 30 produces a mass value indicative of the mass flow rate of material that passes over the weightometer 30.

The train loading system 11 also includes at least one bin mass sensor 32, in this example arranged to measure a change in mass of the bin 20 as a result of differences between the mass of material flowing into the bin 20 and material flowing out of the bin 20.

Using the mass value produced by the weightometer 30, the speed of the conveyor 18, and a mass change value produced by the bin mass sensor(s) 32, the train loading system 11 calculates an estimated mass value indicative of an estimate of the mass of material that has been loaded into each car 14 and stores the estimated mass values.

In conventional train loading in a mine operation, a train arrives at a train loading facility and a clam associated with a loading bin opens as a train car arrives under the clam to commence loading. The train then continues to move slowly relative to the clam until an end of the car is disposed under the clam. When this occurs, the clam automatically closes. Typically, a car weigher is provided at least 4 cars ahead to weigh the loaded car.

As the car moves under the clam and material is added to the car, the operator is able to modify the amount of material in the car by causing the clam 22 to open before the clam 22 is set to automatically open in response to the position of the car, and/or by closing the clam 22 before the clam 22 is automatically closed in response to the position of the car 14. The operator may also be able to override automatic operation of the clam by opening the clam 22 after the clam is intended to automatically open in response to the position of the car 14, and/or closing the clam 22 after the clam is intended to automatically close in response to the position of the car 14.

The operator controls the clam in this way based on past experience and previous car masses measured by the car weigher. If previous car masses have been relatively high, the tendency of the operator is to be cautious and fill the cars at a relatively low level.

Figure 2:
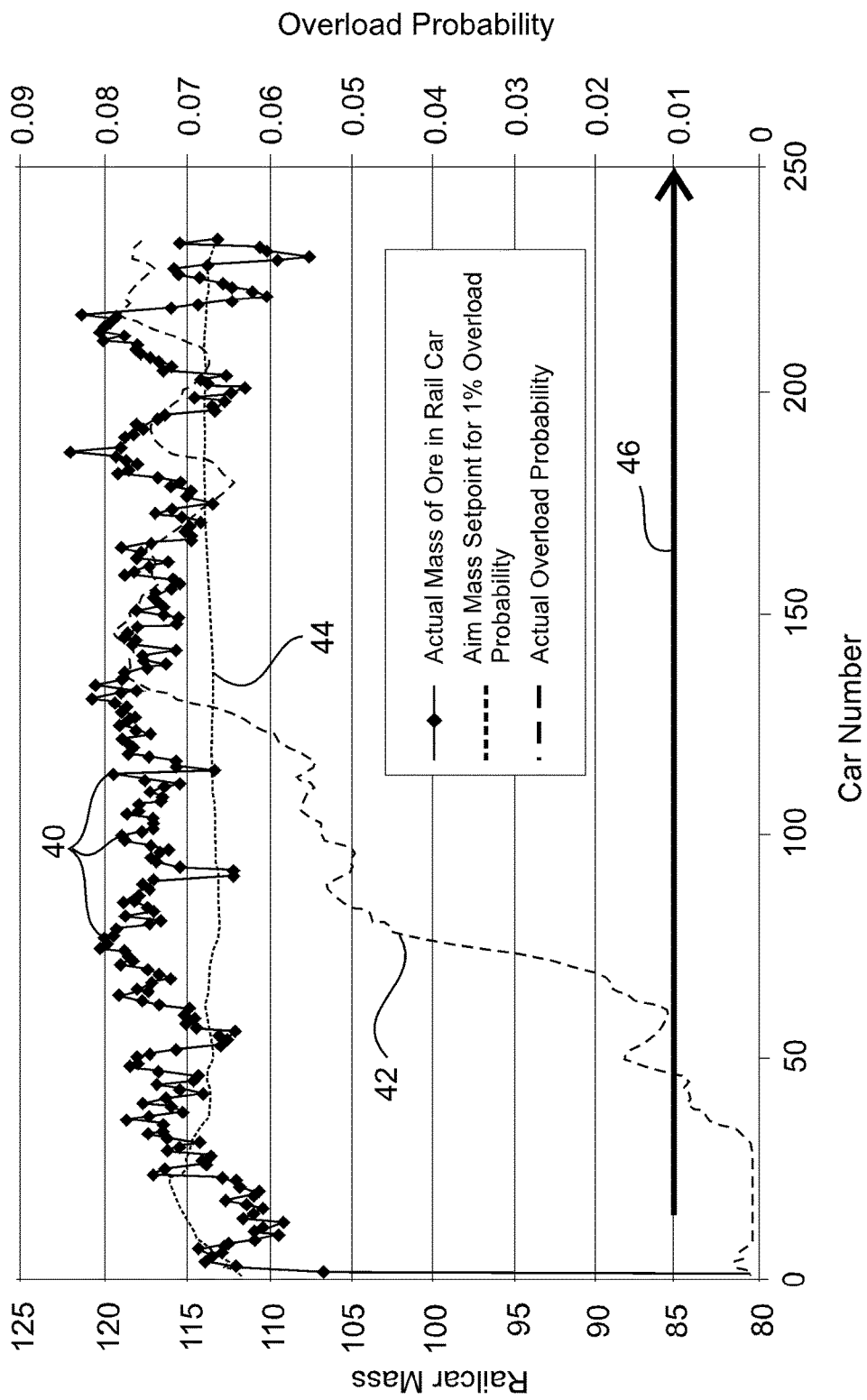
FIG. 2 shows plots illustrating a first example of loading performance of a conventional train loading facility.
Figure 3:
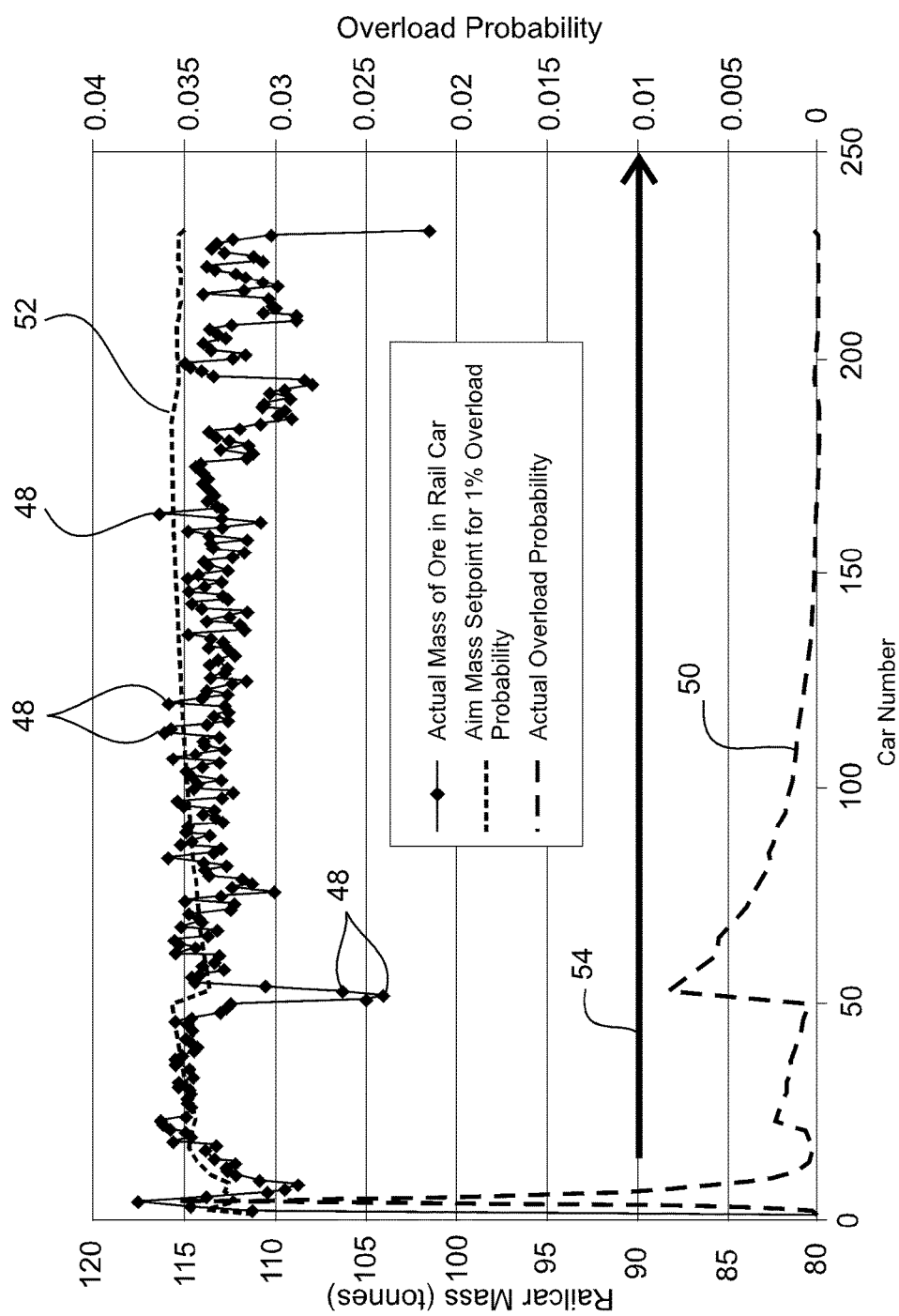
FIG. 3 shows plots illustrating a second example of loading performance of a conventional train loading facility.

Graphs illustrating first and second examples of loading performance of a conventional train loading facility are shown in FIGS. 2 and 3. The graphs include car mass values 40, 48 indicative of actual mass values of train cars measured by the car weigher, an overload probability plot 42, 50 indicative of the calculated probability of overload based on the variability of the car mass values 40, 48, and an aim mass plot 44, 52 indicative of a relatively safe mass that the operator should have aimed for in order for the likelihood of a car mass overload to be statistically small, in this example a probability of 0.01. Arrows 46, 54 illustrate the aim overload probability, in this example 0.01

For each of the graphs shown in FIGS. 2 and 3, the defined car overload mass is 120 tonnes.

It is apparent from FIG. 2 that the average car mass was too high for the illustrated sample of car mass values 40, and in particular in view of the standard deviation of the car mass values 40. The car mass values 40 shown in FIG. 2 have a relatively large standard deviation and therefore a relatively high degree of variability. As a consequence, in order to reduce the likelihood of overloads, a more conservative average car mass was required to be selected by a train loading operator in order to provide a relatively low likelihood of car overload. This is illustrated by the aim mass plot 44 which shows an aim car mass that is generally lower than the car mass values 40, and the overload probability plot 42 which illustrates that the overload probability has significantly increased beyond the defined acceptable overload probability limit 0.01.

It is apparent from FIG. 3 that the average car mass was too low for the illustrated sample of car mass values 48, and in particular in view of the standard deviation of the car mass values 48. The car mass values 48 shown in FIG. 3 have a relatively small standard deviation and therefore a relatively low degree of variability. As a consequence, a higher average car mass could have been selected after about the $75^{th}$ car whilst still maintaining a relatively low likelihood of overload. This is illustrated by the aim mass plot 52 which shows an aim car mass after about the $75^{th}$ car that is generally higher than the car mass values 48, and the overload probability plot 50 which illustrates that the overload probability has decreased significantly below the defined acceptable overload probability limit 0.01. With the example shown in FIG. 3, approximately 380 tonnes could have been loaded into the train cars without increasing the probability of overload beyond the target level 0.01.

It will be appreciated that the variability of the car mass values, in this example represented by the standard deviation, has a significant effect on the probability of occurrence of an overload. This is because a larger standard deviation corresponds to a greater variation of car mass values, and therefore for a given average car mass value more car mass values above the overload mass level. It therefore follows that for car mass values that have a relatively large standard deviation, the desired average car mass, that is the aim car mass, should be reduced in order that the likely number of car mass values above the overload mass is maintained relatively low, and for car mass values that have a relatively small standard deviation, the desired average car mass, that is the aim car mass, should be increased in order that a more optimum level of material is loaded into a car whilst still maintaining the likely number of car mass values above the overload mass relatively low. Accordingly, by appropriately selecting the aim car mass in view of the standard deviation of recent car mass values, the mass of material loaded into a train can be increased without unduly affecting the probability of train overloads.

Figure 4:
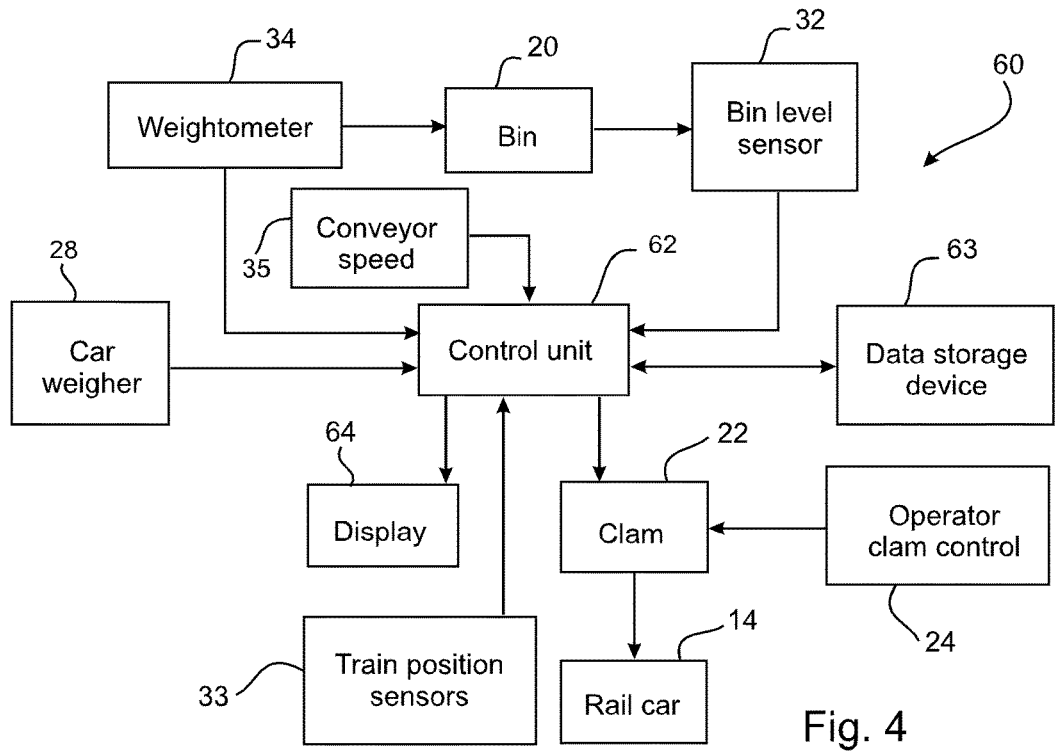
FIG. 4 is a block diagram of a train loading system according to an embodiment of the present invention.

Referring to FIG. 4, a block diagram 60 of the train loading system 11 is shown. The train loading system includes a control unit 62 for controlling and coordinating operations in the train loading system, and a display 64 for displaying train loading information to an operator during a train loading operation.

The control unit 62 may include associated data storage 63 and memory necessary for storing data and/or programs usable by the control unit 62 to implement desired functionality. In this example, the control unit 62 is arranged to control automatic opening and closing of the clam 22 in response to signals received from the train position sensors 33; to facilitate manual opening and/or closing of the clam 22 by an operator so as to modify the total amount of material in a car 14; to store car mass values produced by the car weigher 28 and calculate a mass variability value indicative of the variability of the measured car mass values, in this example in the form of a standard deviation of the measured car mass values; to calculate estimated mass values for each car 14 based on the conveyor weightometer 34, conveyor speed 35 and the bin level sensors 32; to calculate an estimated aim set point indicative of a suggested average car mass that a train loading operator should aim for in order to maintain an overload probability at a defined level, in this example 0.01, whilst achieving a relatively high car mass; and to control display of train loading information on the display 64.

Figure 5:
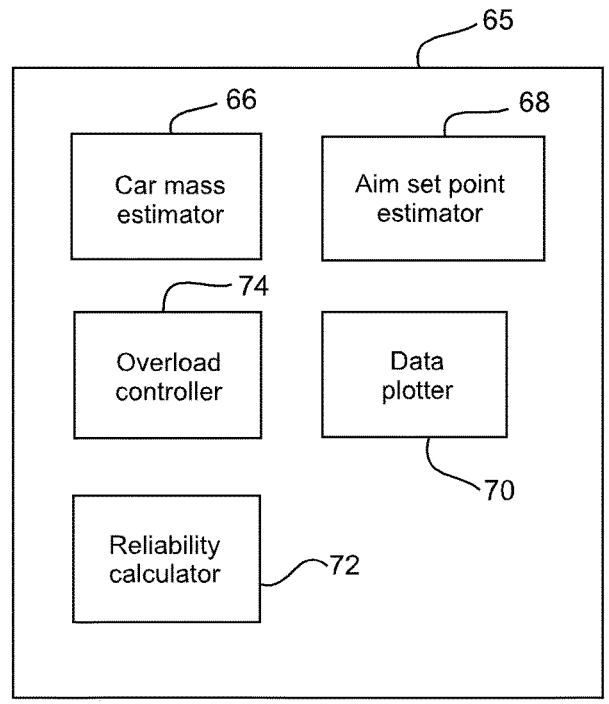
FIG. 5 is a block diagram illustrating functional components implemented by the train loading system shown in FIG. 4.

Functional components 65 implemented by the train loading system, in this example using the control unit 62 are shown in FIG. 5. The functional components 65 include a car mass estimator 66 arranged to calculate the estimated mass value for each car 14 based on the conveyor weightometer 34 and the bin level sensors 32; an aim set point estimator 68 arranged to calculate an aim set point indicative of a suggested average car mass that a train loading operator should aim for in order to maintain an overload probability at a defined level; a data plotter 70 arranged to control display of the train loading information on the display 64; and a reliability calculator 72 arranged to calculate a reliability value based on the degree of correlation between the measured car mass values and the corresponding estimated car mass values.

The aim set point is calculated in this example by the aim set point estimator 68 which determines a variability value indicative of the variability of the measured car values, in this example the standard deviation of the measured car mass values and estimated car mass values, and uses the variability value with a defined probability of occurrence of an overload to determine a car set point mass value to be used by an operator as a target car mass.

Railcar masses tend to approximate a normal distribution, and as such a 1% probability of exceeding a defined value occurs at a value equal to the mean value of the mass values plus 2.33σ, where σ is the standard deviation of the mass values. Accordingly, for mass values that have high variability, the average railcar mass must be lower than for mass values that have low variability, in order to maintain the same 1% probability of overload. By calculating the standard deviation of the measured and estimated mass values, and defining a desired probability that corresponds to a defined overload mass, an average mass value can be calculated that is appropriate to use as the aim mass value.

Figure 6:
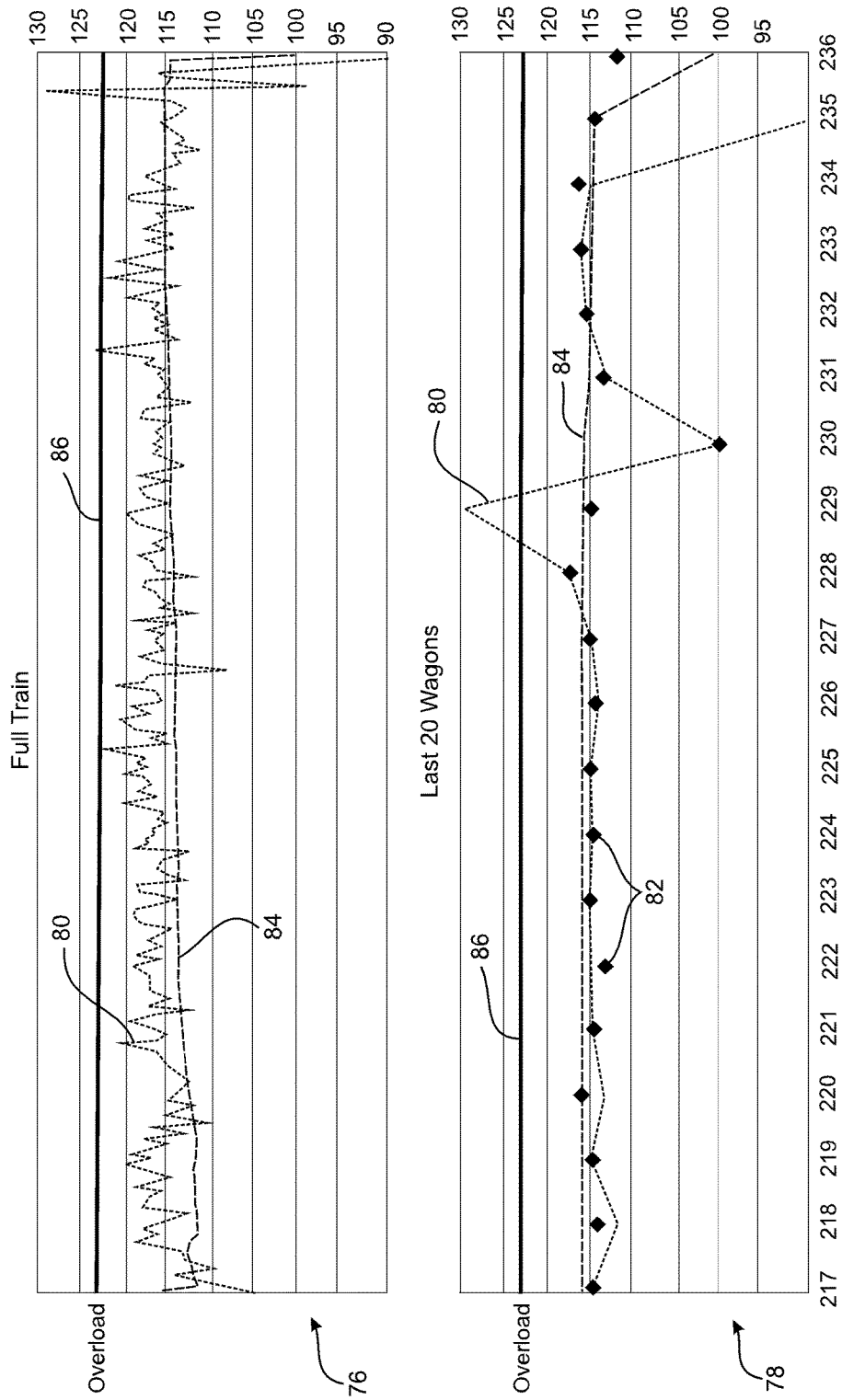
FIG. 6 is a representation of a display showing train loading information for use by an operator during a train car loading operation.

As shown in FIG. 6, the train loading information displayed to an operator includes a full train graph 76 and a recent cars graph 78. Each of the graphs includes an estimated mass values plot 80 indicative of the estimated mass values for each car 14, an aim set point plot 84, and a car overload level 86. Also displayed on the recent cars graph 78 are measured values 82 for each car 14. In this example, the recent cars graph 78 shows information for the last 20 cars of a train.

The train loading information may also include a reliability indicator 88 (not shown) used to communicate the reliability value to the operator.

It will be appreciated that the estimated mass values plot 80 is 4 cars ahead of the measured mass values 82 because the car weigher 28 is 4 cars ahead of the bin 20 and associated clam 22.

It will be understood that by using the displayed train loading information an operator is able to obtain an indication as to how close the recent actual car masses are to the aim car mass, the reliability of the displayed estimated masses, and thereby whether the operator can confidently increase the amount of material loaded into a car to a level closer to the aim car mass, or whether the operator should reduce the amount of material loaded into a car to a level closer to the aim car mass so as to reduce the likelihood of an overload.

Figure 7:
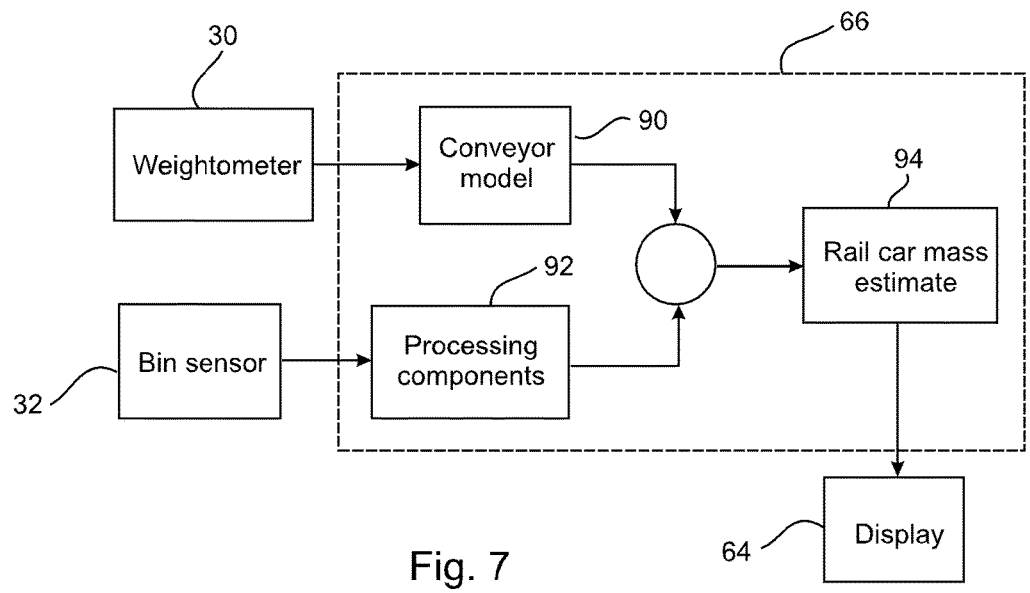
FIG. 7 is a block diagram of a car mass estimator of the train loading system shown in FIG. 4.

Functional components of the car mass estimator 66 are shown in FIG. 7. In this example, the functional components 66 include a conveyor model 90 arranged to calculate a mass value indicative of the mass that is added to the bin 20 by the conveyor 18 based on the mass data provided by the weightometer 30.

The functional components 66 also include processing components 92 arranged to process bin level information from the bin level sensors 32 in order to produce a processed bin level value indicative of a mass change of the bin 20 as material is loaded into the bin 20 and material is removed from the bin 20 during loading. The processing components 92 are arranged to at least partially compensate for interference to bin level measurement caused by rapid movement of large quantities of material, and movement of the trains 12 adjacent the bin 20.

Using the mass value indicative of the mass added to the bin 20 and the processed bin level value indicative of the bin mass change, an estimated car mass value 94 is produced that is stored and shown on the display 64.

The estimated car mass value is equal to the mass of ore delivered to the bin while the car is present minus the change in bin mass during this time.

Figure 8:
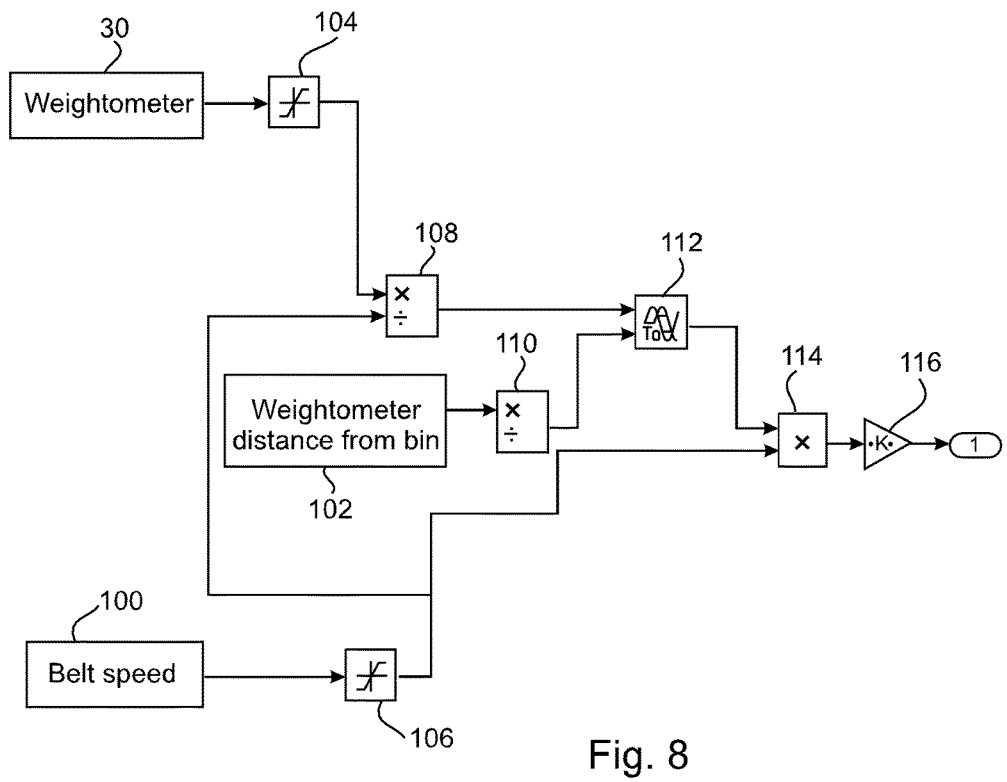
FIG. 8 is a block diagram illustrating a car mass calculation algorithm used by the car mass estimator shown in FIG. 7.

An example algorithm for calculating an estimated value for the mass added to the bin 20 is shown in FIG. 8.

The algorithm includes applying a first saturation filter 104 to the mass flow rate value received from the weightometer 30 to remove spurious values from the mass flow rate, and applying a second saturation filter 106 to the belt speed 100 to remove spurious values from the belt speed 100.

A divider 108 divides the mass flow rate produced by the weightometer 30 by the belt speed 100 to produce a mass value indicative of the mass per metre on the conveyor 18. A divider 110 divides the distance between the weightometer 30 and the bin 20 by the belt speed 100 to produce a time value indicative of the amount of time taken for the mass of material on the weightometer 30 to reach the bin 20. Essentially, the distance between the weightometer 30 and the bin 20 is treated as a series of consecutive material portions with each portion having an associated mass per metre value associated with it.

A delay component 112 applies the calculated delay to the mass per metre value, and a multiplier 114 multiplies the delayed mass per metre value by the belt speed 100 to produce an estimated value for the mass added to the bin 20.

As shown in FIG. 5, the functional components also include an overload controller 74 that in this example is implemented by the control unit 62. However, as an alternative it will be understood that the overload controller 74 may be implemented by a separate component to the control unit 62.

The overload controller 74 is arranged to cause the clam 22 to close before a signal to close the clam 22 is received from the train position sensors 33, if the current mass of the car 14 estimated using the conveyor weightometer 34 and the bin level sensors 32 indicates that the car 14 is likely to overload.

Figure 9:
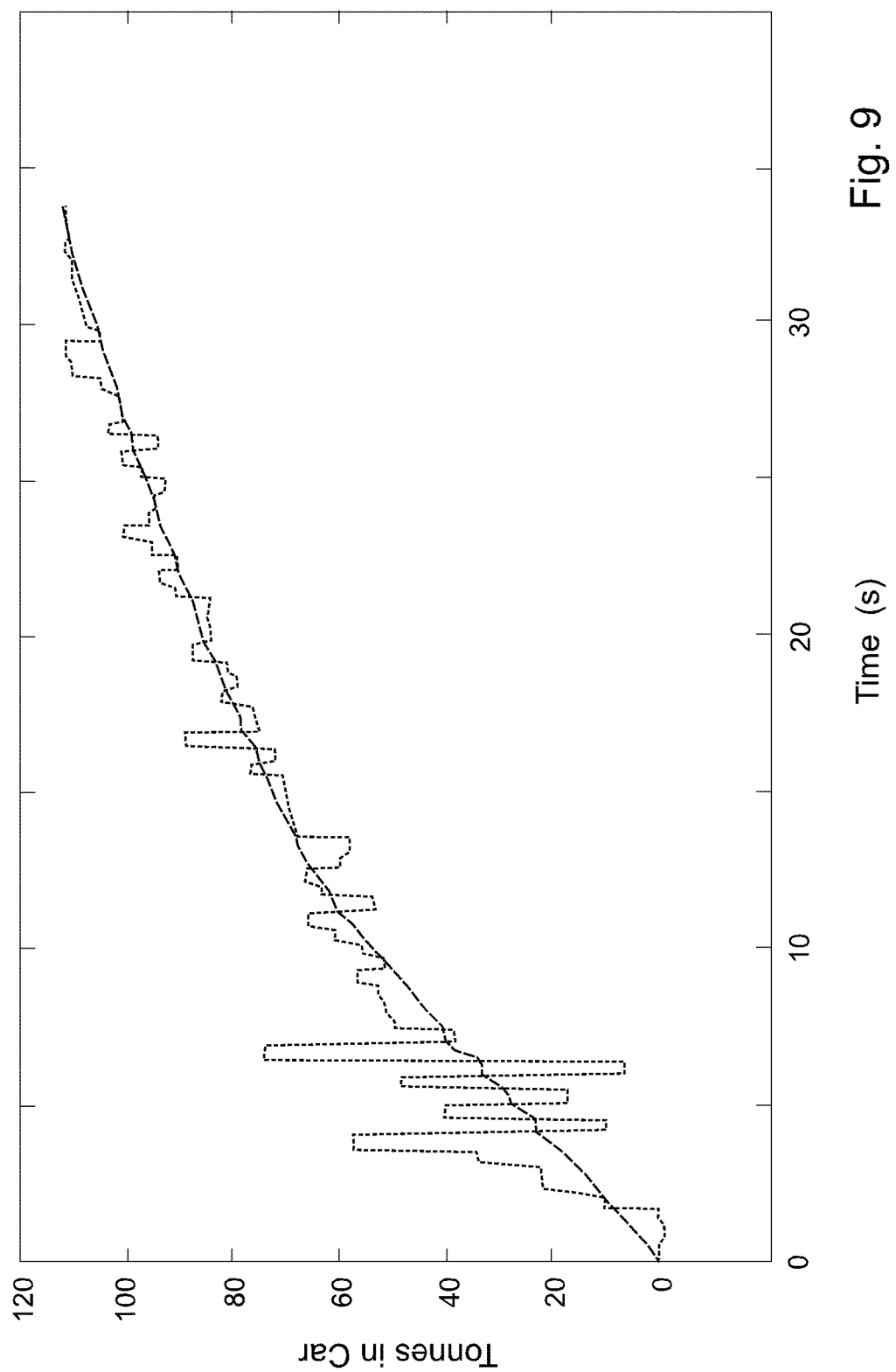
FIG. 9 shows a plot of measured car mass during car loading that is used by an overload controller to control deactivation of material flow during car loading.

In the present example, as shown in FIG. 9, the overload controller 74 is arranged to cause the clam 22 to close when the estimated mass reaches 110 tonnes.

Figure 10:
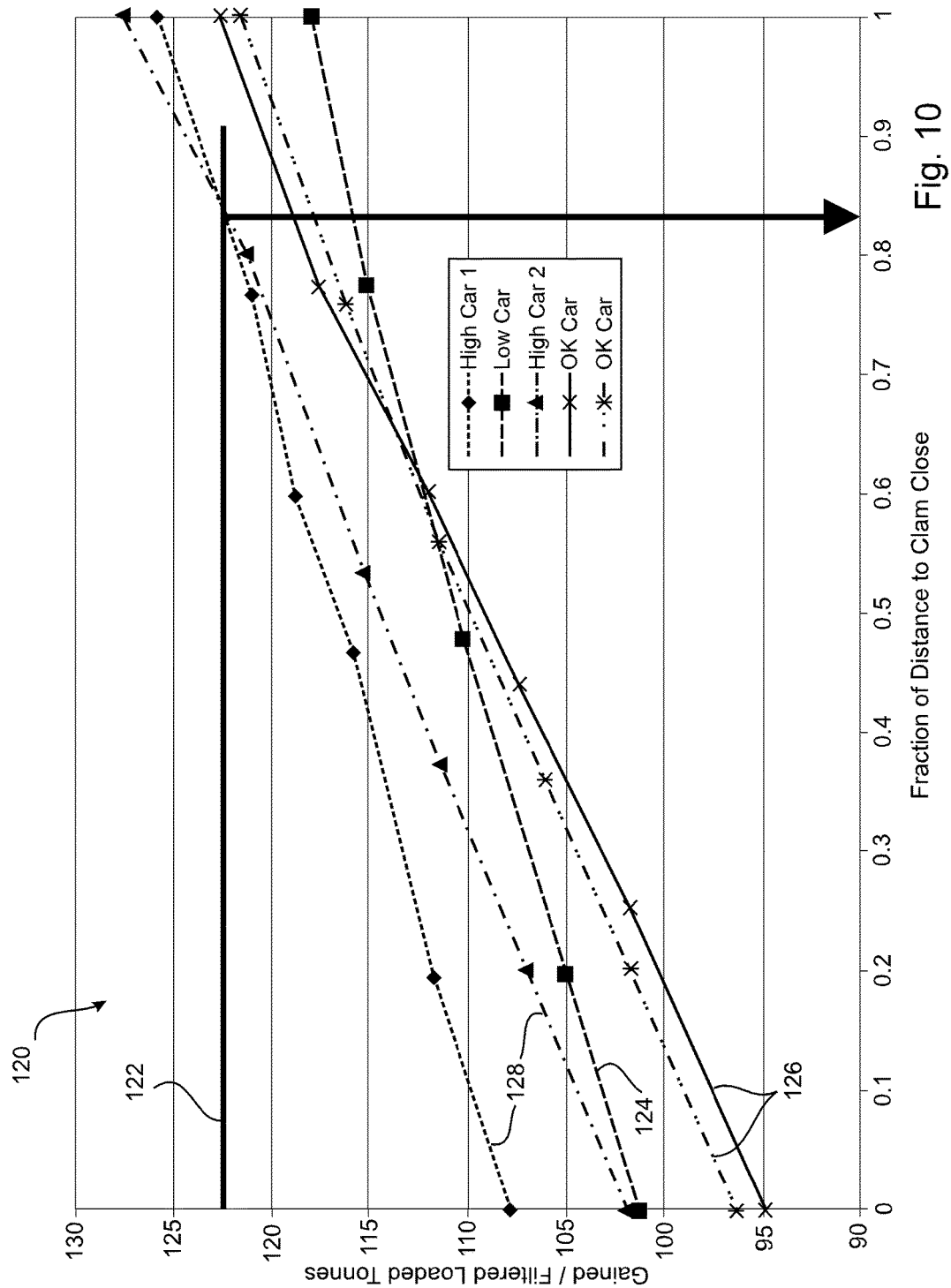
FIG. 10 shows plots of measured car mass relative to a car mass overload limit during loading of several train cars.

A train loading mass graph 120 is shown in FIG. 10. The graph 120 shows an overload mass level 122, in this example set at 123 tonnes, and includes several plots 124, 126, 128 of estimated car mass over time. As shown, a first plot 124 indicates a car mass that increases to a relatively low but acceptable final car mass of about 118 tonnes, second plots 126 indicate car masses that increase to acceptable final car masses of about 122 and 123 tonnes respectively, and third plots 128 indicate car masses that are increasing too quickly and have reached the overload limit 122 after only 85% of the full travel distance of a car during loading. When the overload mass level 122 is reached, the overload controller 74 causes the clam 22 to close. In the present example, this equates to closing the clam 22 1.5 seconds early.

With this example, a digital filter algorithm that has a time constant of about 3.2 s and a gain of 1.2 is applied to an instantaneous car mass value by the overload controller to filter out any spurious values, and when the filtered signal reached about 123 tonnes, the clam 22 is caused to close.

It will be appreciated that by providing an overload controller 74 arranged to intervene if a car is expected to overload, in effect the normal distribution of loaded car masses centered around the aim car mass is skewed towards higher car masses whilst providing a very low probability of occurrence of an overloaded car. In other words, providing an overload controller has the effect of automatically increasing the aim car mass if the overload controller is successful because preventing car overloads from occurring has the effect of causing the standard deviation to reduce. The system is also self-correcting in that if an overload situation occurs, the aim car mass is not increased.

It will also be appreciated that providing an overload controller 74 provides a high probability that the train loading system will fail well in that car overloads are prevented from occurring even if the decision made by the operator in relation to opening or closing of the clam is incorrect, because in an overload situation the clam 22 is closed prematurely by the overload controller 74.

It will also be appreciated that although actual car masses are not known until 4 cars later, by providing and displaying estimated car masses useful loading information can be communicated to the operator which can be used by the operator when making decisions in relation to loading of subsequent cars. The displayed loading information and in particular the overload controller are particularly useful for loading the first 4 cars because no historical actual mass data is available.

At least the control unit 62 may be implemented using appropriate hardware, for example a personal computing type architecture or using a programmable logic controller (PLC).

Figure 11:
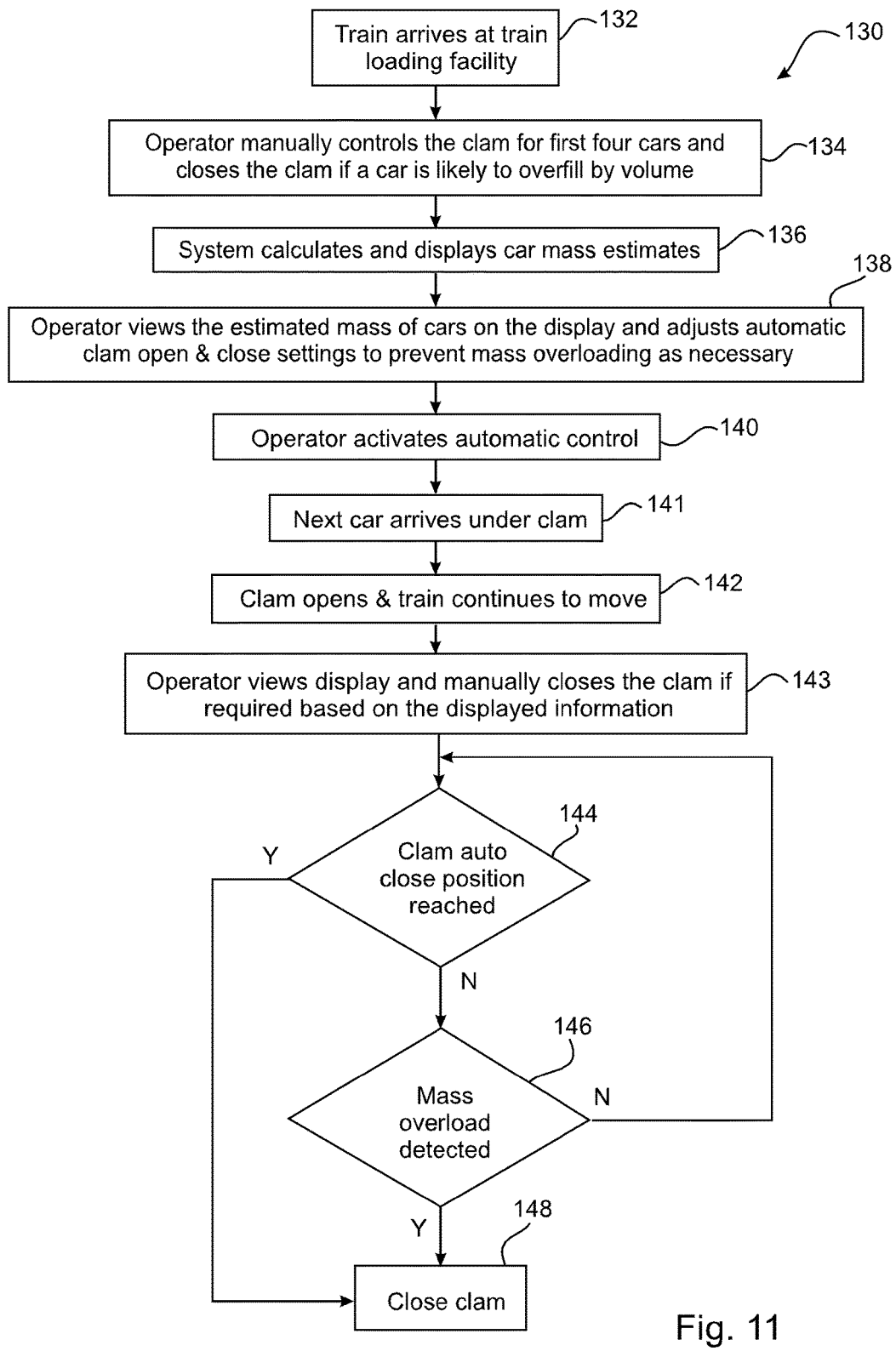
FIG. 11 is a flow diagram illustrating a method of loading a train in accordance with an embodiment of the present invention.
Figure 12:
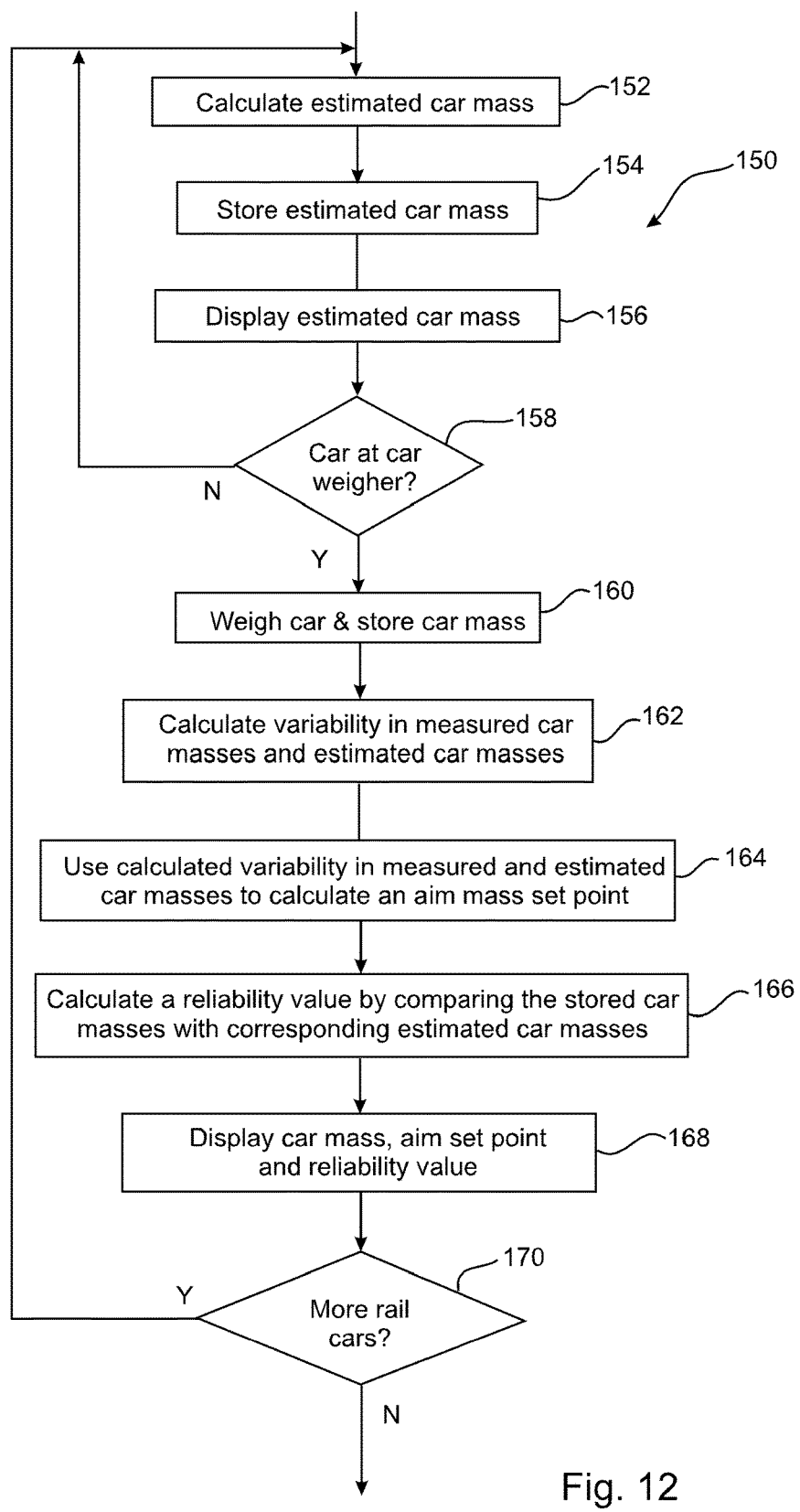
FIG. 12 is a flow diagram illustrating a method of assisting an operator to load a train car as part of the method shown in FIG. 11.

A flow diagram 130 illustrating steps 132 to 148 of a example method of loading a train is shown in FIG. 11, and a flow diagram illustrating steps 152 to 170 of an example method of assisting an operator to load a train car according to the method of FIG. 11 is shown in FIG. 12.

During use, when a train 12 arrives 132 at the train loading facility 10, the train 12 is caused to move slowly relative to the train loading system 11 so that material such as ore can be controllably loaded onto cars 14 of the train 12.

For the first 4 cars 14, that is, until the first car 14 reaches the car weigher 28, the operator monitors the cars 14 and has manual control of the clam 22. The system then calculates and displays car mass estimate values 136, and the operator views 138 the displayed car mass estimates, and adjusts automatic clam opening and closing settings using the estimated values with a view to preventing car mass overloading. The operator then activates automatic control 140.

During automatic control mode, in response to signals provided by the train position sensors 33, the clam is caused to automatically open 142 as the train 12 reaches a defined location relative to the clam 22, which causes material in the bin 20 to flow into the car 14.

As material is loaded into a car 14, the mass of material in the car 14 is estimated 152, stored 154 and displayed 156. When the cars reach the car weigher 28, the actual mass of material in the cars is then measured and stored 160 and a variability value, in this example a standard deviation, is calculated 162 based on the measured car mass values and the estimated car mass values. The variability value is used with a defined overload probability value to calculate 164 the aim mass set point indicative of a suggested average car mass that a train loading operator should aim for. A reliability value is also calculated 166 based on the estimated mass values and the measured mass values, and the car mass values 82, the aim mass set point 84 and a reliability indicator 88 are displayed 168 to an operator as train loading information.

The operator views 143 the train loading information shown on the display, and makes a decision 138 using the train loading information as to whether the clam should be opened late and/or early and/or closed late and/or early in order to maintain a relatively high car mass whilst maintaining a low probability of car overload, for example that is less than the defined amount 0.01.

If the operator does not intervene to close the clam 22 early, but the car reaches an auto close position, the clam is caused to automatically close 144, 148.

Notwithstanding that the operator has used the displayed train loading information to control the amount of material flowing into a car 14, if the overload controller 74 nevertheless determines 146 that the car 14 is likely to overload before automatic closure of the clam 22, the overload controller 74 intervenes, overrides the automatic clam control process and causes the clam 22 to close prematurely 148, thereby preventing a car overload from occurring.

Modifications and variations as would be apparent to a skilled addressee are deemed to be within the scope of the present invention.

The claims defining the invention are as follows:

1. A train loading system for loading material onto cars of a train, the system comprising:
   a material bin arranged to receive material to be loaded onto the train;
   a closure device arranged to facilitate control by an operator of the amount of material loaded into each car from the material bin;
   a car mass estimator that estimates the mass of material loaded into the car; and
   a display to communicate to the operator the estimated mass of material currently loaded into each car;
   wherein the car mass estimator estimates the mass of material loaded into the material bin, estimates a change in mass of the material bin, and uses the estimate of the mass of the material loaded into the bin and the estimate of the change in mass of the material bin to calculate an estimated car mass value indicative of an estimate of the material loaded into the car.

2. A train loading system as claimed in claim 1, wherein the closure device facilitates closing of the closure device in response to operator control.

3. A train loading system as claimed in claim 1, wherein the closure device facilitates opening of the closure device in response to operator control.

4. A train loading system as claimed in claim 1, wherein the train loading system includes a conveyor to transport material to the material bin, and the car mass estimator includes a weightometer associated with the conveyor that measure the mass of material on the conveyor as the material passes over the weightometer.

5. A train loading system as claimed in claim 4, wherein an end of the conveyor is disposed adjacent the bin and the weightometer is disposed a defined distance from the end of the conveyor, wherein the car mass estimator applies a delay to each weightometer measurement and to use the delayed weightometer measurement and the speed of the conveyor to estimate of the mass of material loaded into the material bin.

6. A train loading system as claimed in claim 1, wherein the system includes at least one bin level sensor that produces bin mass data indicative of a change in bin mass, and the system processes the bin mass data so as to reduce noise.

7. A train loading system as claimed in claim 1, wherein the system includes a car weigher arranged to measure the mass of a loaded car, and the system displays measured car mass values on the display.

8. A train loading system as claimed in claim 7, wherein the system calculates a variability value indicative of the variability of the measured car mass values and/or the estimated car mass values.

9. A train loading system as claimed in claim 8, wherein the variability value is a standard deviation value.

10. A train loading system as claimed in claim 9, wherein the system uses a desired probability value indicative of the probability of occurrence of a car overload and the variability value to calculate an aim set point mass indicative of a target car mass.

11. A train loading system as claimed in claim 10, wherein the system displays the aim set point mass on the display.

12. A train loading system as claimed in claim 7, wherein the system calculates a reliability value indicative of the degree of correlation between estimated car mass values and corresponding measured car mass values, and displays information indicative of the reliability value on the display.

13. A train loading system as claimed in claim 1, wherein the system automatically opens and close closes the closure device in synchronization with movement of a train.

14. A train loading system as claimed in claim 1, wherein the system comprises an overload controller that monitors the estimated car mass as the car is loaded with material and automatically closes the closure device when an estimated car mass value reaches a defined overload car mass.

15. A method of loading a train at a mine operation, the method including:
adding material to be loaded onto the train to a material bin;
providing a closure device arranged to facilitate control by an operator of an amount of material loaded into each car from the material bin;
estimating the mass of material loaded into each car and producing an estimated car mass value for each car;
communicating the estimated car mass values to the operator on a display;
determining whether to modify the mass of material currently loaded into a car based on the displayed estimated car mass value of car; and
controlling the closure device to modify the mass of material loaded into the car if the determination indicates that modification of the mass of material loaded into the car is necessary;
wherein the step of estimating the mass of material loaded into each car comprises estimating the mass of material loaded into the material bin, estimating a change in mass of the material bin, and using the estimate of the mass of material loaded into the material bin and the estimate of the change in the mass of the material bin to calculate an estimated car mass value indicative of an estimate of the material loaded into the car.

16. A method as claimed in claim 15, comprising transporting material to the material bin using a conveyor, measuring the mass of material on the conveyor using a weightometer, disposing the weightometer at a defined distance from the end of the conveyor, applying a delay to each weightometer measurement, and using the delayed weightometer measurement and the speed of the conveyor to estimate the mass of material loaded into the material bin.

17. A method as claimed in claim 15, comprising calculating a variability value indicative of the variability of measured car mass values and/or the estimated car mass values.

18. A method as claimed in claim 17, comprising using a desired probability value indicative of the probability of occurrence of a car overload and the variability value to calculate an aim set point mass indicative of a target car mass.

19. A method as claimed in claim 15, comprising calculating a reliability value indicative of the degree of correlation between estimated car mass values and corresponding measured car mass values, and displaying information indicative of the reliability value.

20. A method as claimed in claim 15, comprising automatically opening and closing the closure device in synchronization with movement of a train.

21. A method as claimed in claim 15, comprising monitoring the estimated car mass as the car is loaded with material and automatically closing the closure device when an estimated car mass value reaches a defined a overload car mass.

* * * * *